United States Patent [19]

Ebert et al.

[11] Patent Number: 4,535,149

[45] Date of Patent: Aug. 13, 1985

[54] PROCESS FOR THE PRODUCTION OF POLYARYLENE SULPHIDES

[75] Inventors: Wolfgang Ebert; Rolf-Volker Meyer; Karsten-Josef Idel; Rolf Dhein, all of Krefeld, Fed. Rep. of Germany

[73] Assignee: Bayer Aktiengesellschaft, Leverkusen, Fed. Rep. of Germany

[21] Appl. No.: 607,957

[22] Filed: May 7, 1984

[30] Foreign Application Priority Data

May 17, 1983 [DE] Fed. Rep. of Germany ....... 3317821

[51] Int. Cl.³ ............................................. C08G 75/14
[52] U.S. Cl. .................................................... 528/388
[58] Field of Search ......................................... 528/388

[56] References Cited

U.S. PATENT DOCUMENTS 3,725,362 4/1973 Walker ................................ 528/388
4,314,920 2/1982 Millen ................................ 528/388

*Primary Examiner*—Melvyn I. Marquis
*Attorney, Agent, or Firm*—Connolly and Hutz

[57] ABSTRACT

This invention relates to a new process for the production of optionally branched polyarylene sulphides from optionally substituted halo-benzenes in admixture with polyhalogen aromatic compounds and alkali sulphides in polar solvents in the presence of disulphide compounds.

10 Claims, No Drawings

PROCESS FOR THE PRODUCTION OF POLYARYLENE SULPHIDES

This invention relates to a new process for the production of optionally branched polyarylene sulphides from optionally substituted halo-benzenes in admixture with polyhalogen aromatic compounds and alkali sulphides in polar solvents in the presence of disulphide compounds.

Polyarylene sulphides are known (see U.S. Pat. Nos. 3,648,941 and 2,513,188). They may be produced from the corresponding halogen aromatic compounds and alkali- or alkaline earth sulphides. Thus, for example according to the process described in U.S. Pat. No. 3,354,129, monomeric and polymeric sulphides are produced by reacting at least one cyclic compound which contains a double bond between adjacent ring atoms and is substituted by at least one halogen atom, with an alkali sulphide in a polar solvent. Polyhalogen compounds may be used as branching agents.

DE-AS No. 2,453,749 describes the use of carboxylates as reaction accelerators and the additional use of thio compounds as sulphur donors. DE-OS No. 2,623,363 or U.S. Pat. No. 4,038,261 discloses the use of lithium chloride or lithium carboxylates as catalysts for the production of arylene sulphide polymers.

According to U.S. Pat. No. 4,038,259, alkali carbonates, combined with alkali carboxylates are used as catalysts for the production of polyphenylene sulphides and, according to U.S. Pat. No. 4,038,263, lithium halides are used as catalysts for the same production process. According to DE-OS No. 2,623,362 or U.S. Pat. No. 4,038,262, lithium halides or alkali carboxylates are used together with carbon dioxides and alkali hydroxides as catalyst for the production of arylene sulphide polymers.

Furthermore, U.S. Pat. No. 4,038,260 for example discloses the use of alkali metal sulphonates as catalysts, and U.S. Pat. No. 4,039,518 discloses the use of lithium carbonate and lithium borate as catalysts.

Polyarylene sulphides which have a reduced melt flow behaviour may be obtained using trialkali phosphate catalysts (DE-OS No. 2,930,718) or using alkali phosphonate catalysts (DE-PS No. 2,930,797).

It is known from DE-OS No. 2,623,333 that the water of hydration of the lithium acetate which is used as catalyst may be removed first of all and the water of hydration of the sodium sulphide hydrate may then be removed in a second step.

The p-polyphenylene sulphides are generally subjected to a hardening or curing step by a chain-lengthening- and branching reaction (for example U.S. Pat. Nos. 3,727,620; 3,524,835 and 3,839,301). Without this hardening step, the p-polyphenylene sulphides generally have a very low melt viscosity, which means that the sulphides can hardly be processed thermoplastically.

U.S. Pat. No. 4,116,947 or DE-OS No. 2,817,731 states that a certain quantity of residual water enables the p-polyphenylene sulphides to be spun into fibres without a hardening step, and to be extruded and compression moulded.

This prior art generally presupposes the use of alkali carboxylates. Furthermore, certain quantities of water are present in the reaction mixture. Moreover, the quantities in which these catalysts are used far exceed conventional catalytic quantities. They are used in an almost equimolar manner. In addition thereto, the use of alkali hydroxides is necessary in quantities of up to 20 mol %.

It has been found that polyarylene sulphides are obtained in good yields without the addition of alkali carboxylates by carrying out the production of the polyarylene sulphides in the presence of small quantities of disulphide compounds.

The polyarylene sulphides which are obtained in this manner are distinguished by particularly high melting points which indicate increased crystallisation, and by a high degree of purity.

Thus, an object of the present invention is to provide a process for the production of optionally branched, high molecular weight polyarylene sulphides which have an improved dimensional stability under heat, from (a) dihalo-benzenes, of which from 0 to 100 mol %, preferably from 50 to 100 mol % correspond to formula (I)

and from 0 to 100 mol %, preferably from 0 to 50 mol % correspond to formula (II)

wherein each
X represents a halogen, such as fluorine, chlorine or bromine which is in the meta- or para-position with respect to each other, and
$R^1$ which may be the same or different, may represent hydrogen, $C_1$–$C_{20}$ alkyl, $C_5$–$C_{20}$ cycloalkyl, $C_6$–$C_{24}$ aryl, $C_7$–$C_{24}$ alkaryl or $C_7$–$C_{24}$ aralkyl, and two radicals $R^1$ which are in the ortho-position with respect to one another may be linked to form an aromatic or heterocyclic 5–10-membered ring which may contain up to three heteroatoms, such as O, N, S, and at least one radical $R^1$ is always different from hydrogen, and (b) from 0 to 5.0 mol %, preferably from 0.1 to 2.0 mol %, based on the total of the dihalogen aromatic compounds corresponding to formulae (I) and (II), of a tri- or tetrahalogen aromatic compound corresponding to formula (III)

ArHal$_n$       (III)

wherein
Ar represents an aromatic or heterocyclic radical which may contain up to three heteroatoms, such as N, O, S and has from 6 to 24 carbon atoms,
Hal represents halogen, such as fluorine, chlorine, bromine or iodine, and
n represents the number 3 or 4, and (c) alkalisulphides, preferably sodium or potassium sulphide or the mixture thereof, optionally in the form of the hydrates, optionally together with alkali hydroxides, such as sodium and potassium hydroxide, the molar ratio of (a+b):c ranging from 0.85:1 to 1.15:1, preferably from 0.95:1 to 1.05:1, (d) in a polar solvent, optionally in the presence of other co-solvents, the molar ratio of (c) to (d) ranging from 1:2 to 1:15, characterised in that the above-mentioned components are reacted together in the presence of disulphides corresponding to formula (IV)

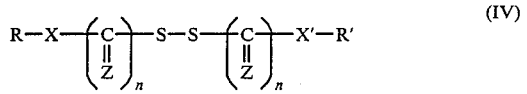
(IV)

wherein

R and R' which are the same or different, represent $C_1-C_{20}$ alkyl, $C_5-C_{20}$ cycloalkyl, $C_6-C_{24}$ aryl or $C_7-C_{24}$ aralkyl, and from 1 to 3 ring carbon atoms may be replaced by heteroatoms, such as N, O in the cycloalkyl or aryl or aralkyl radicals, X and X' which may be the same or different, represent a single bond, O, S or

wherein $R^2$ represents hydrogen and has the meaning stated for R, and R and $R^2$ may also be members of a common optionally heterocyclic ring having from 5 to 7 ring members, Z and Z' which may be the same or different, represent O, S, NR, wherein R is as defined above, and n represents the number 0 or 1.

Examples of dihalo-benzenes which may be used according to the present invention and correspond to formula I are as follows: p-difluorobenzene, p-dichlorobenzene, p-dibromobenzene, 1-fluoro-4-chlorobenzene, 1-fluoro-4-bromobenzene, 1-chloro-4-bromobenzene, m-difluorobenzene, m-dichlorobenzene, m-dibromobenzene, and 1-chloro-3-bromobenzene. They may be used on their own or mixed together.

Examples of dihalo-benzenes which may be used according to this invention and correspond to formula II are as follows: 2,5-dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,2,4,5-tetramethyl-3,6-dichlorobenzene, 1-cyclohexyl-2,5-dichlorobenzene, 1-phenyl-2,5-dichlorobenzene, 1-benzyl-2,5-dichlorobenzene, 1-pheny-2,5-dibromobenzene, 1-p-tolyl-2,5-dichlorobenzene, 1-p-tolyl-2,5-dibromobenzene, 1-hexyl-2,5-dichlorobenzene and 1,4-dichloroanthraquinone. They may be used on their own or mixed together.

Examples of polyhalogen aromatic compounds corresponding to formula III to be used according to this invention are as follows: 1,2,3-trichlorobenzene, 1,2,4-trichlorobenzene, 1,2,4-tribromobenzene, 1,2,4-triiodobenzene, 1,3,5-trichloro-2,4,6-trimethylbenzene, 1,2,3-trichloronaphthalene, 1,2,4-trichloronaphthalene, 1,2,6-trichloronaphthalene, 2,3,4-trichlorotoluene, 2,4,6-trichlorotoluene, 1,2,3,4-tetrachloronaphthalene, 1,2,4,5-tetrachlorobenzene, 2,2'-4,4'-tetrachlorobiphenyl and 1,3,5-trichloro-triazine.

Polar solvents which ensure an adequate solubility of the organic and inorganic reactants under the reaction conditions may be used for the present process. Lactams and amides are preferred, and N-alkyl lactams are more preferably used.

The following are included as examples of solvents: dimethylformamide, dimethylacetamide, caprolactam, N-methylcaprolactam, N-ethylcaprolactam, N-isopropylcaprolactam, N-methyl-2-pyrrolidone, N-ethyl-2-pyrrolidone, N-isopropyl-2-pyrrolidone, N-methyl-3-methyl-2-pyrrolidone, N-methyl-5-methyl-2-pyrrolidone, N-methyl-3,4,5-trimethyl-2-pyrrolidone, N-methyl-2-piperidone, N-ethyl-2-piperidone, N-methyl-6-methyl-2-piperidone, and N-methyl-3-ethyl-2-piperidone.

Mixtures of the above-mentioned solvents may also be used.

The alkali sulphides which are used may be produced from hydrogen sulphide or from alkali hydrogen sulphides and corresponding stoichiometric quantities of alkali hydroxides, by neutralisation inside or outside the reaction solution. When the pure alkali sulphides are used, alkali hydroxides may also be added in order to neutralize alkali hydrogen sulphides which may be admixed.

Compounds corresponding to formula IV which may be used according to the present invention include the following, for example:

(a) diacyldisulphides corresponding to formula (V)

(V)

wherein R and R' are defined as in formula (IV), for example

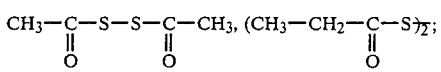

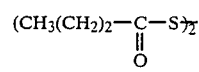

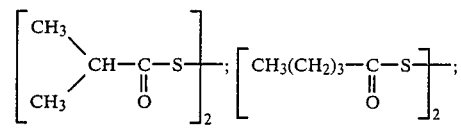

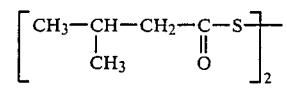

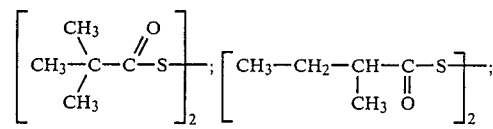

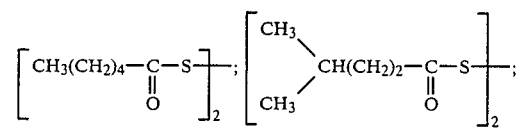

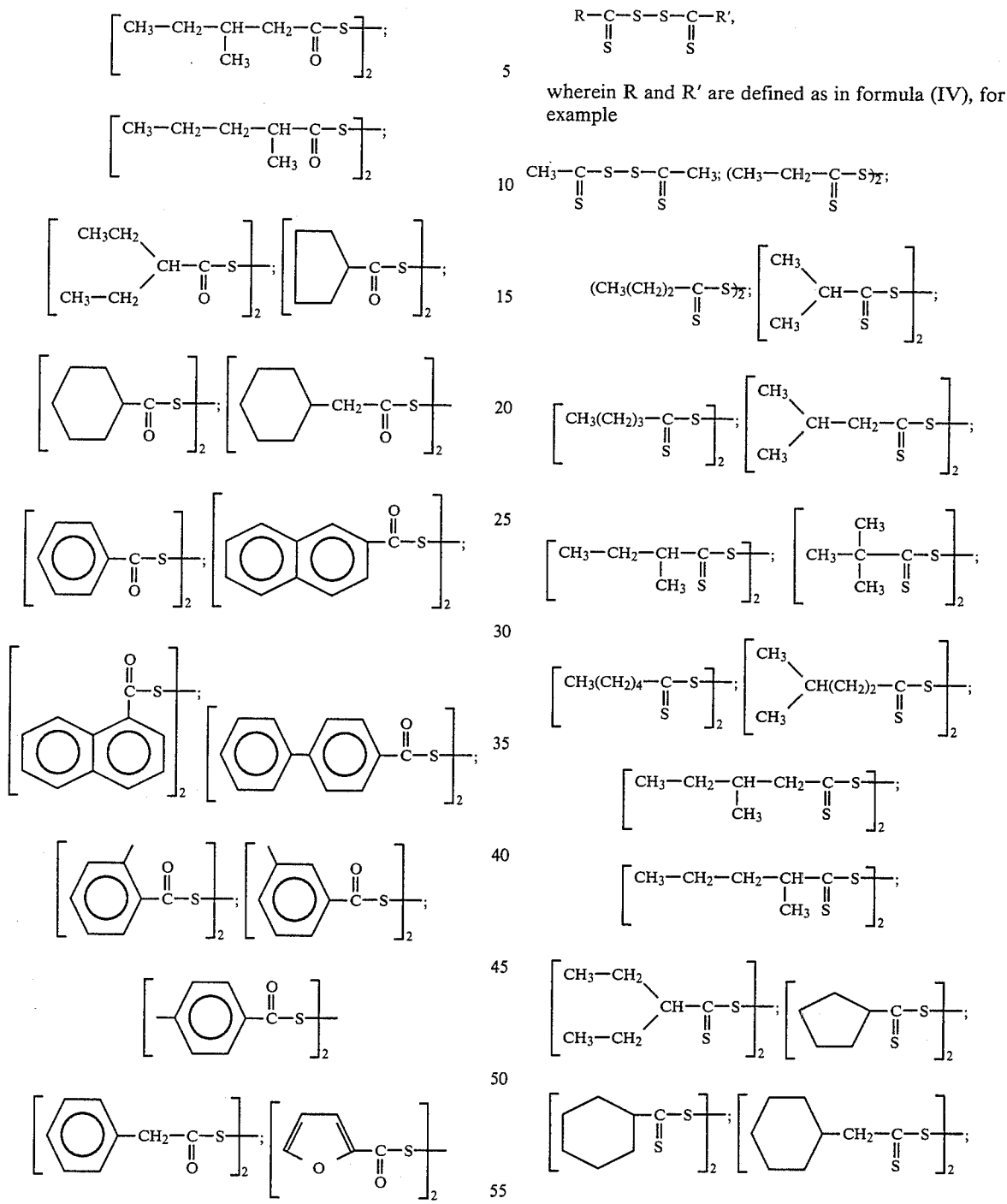

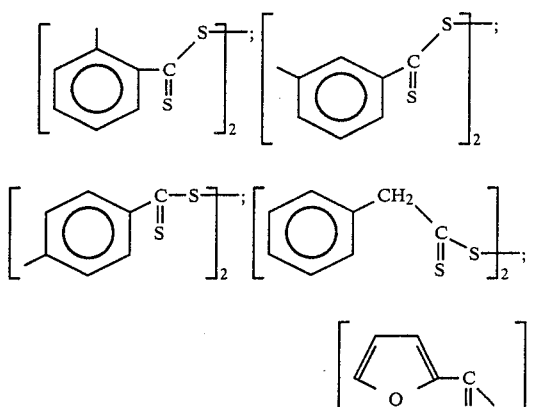

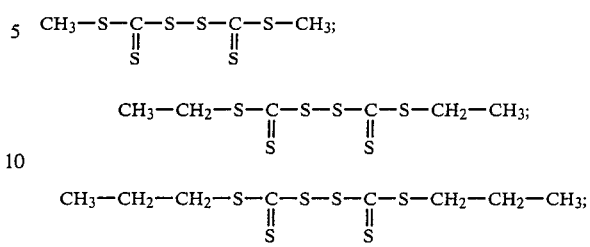

(c) xanthogene disulphides corresponding to formula (VII)

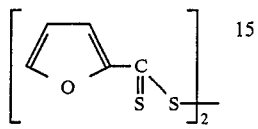

wherein R and R' are defined as in formula (IV), for example:
dimethylxanthogene disulphide, diethylxanthogene disulphide, di-n-propylxanthogene disulphide, di-i-propylxanthogene disulphide, di-(1-methylpropyl)-xanthogene-, di-tert.-butylxanthogene-, dipentylxanthogene-, di-(3-methylbutyl)-xanthogene-, di-(2-methylbutyl)-xanthogene-, di-(1-methylbutyl)-xanothogene-, di-(1-ethylpropyl)xanthogene disulphide, dicyclopropylxanthogene-, di-(3-methylcyclopentyl)-xanthogene-, dicyclopentylxanthogene, dicyclohexylxanthogene disulphide, diphenylxanthogene-di-1-naphthylxanthogene-, di-β-naphthylxanthogene-, bis(diphenyl)-xanthogene-, di-(o-cresylxanthogene-, di-(m-cresyl)-xanthogene-, di-(p-cresylxanthogene-), dibenzylxanthogene disulphide and as hetero-modified xanthogenedisulphides,

preferably dimethylxanthogenate, diethylxanthogenate, di-i/n-propylxanthogenate, dibenzylxanthogenate and diphenylxanthogenate.

(d) trithiocarbonic acid derivatives corresponding to formula (VIII)

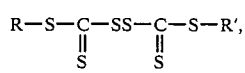 (VIII)

wherein R and R' are defined as in formula (IV), for example:

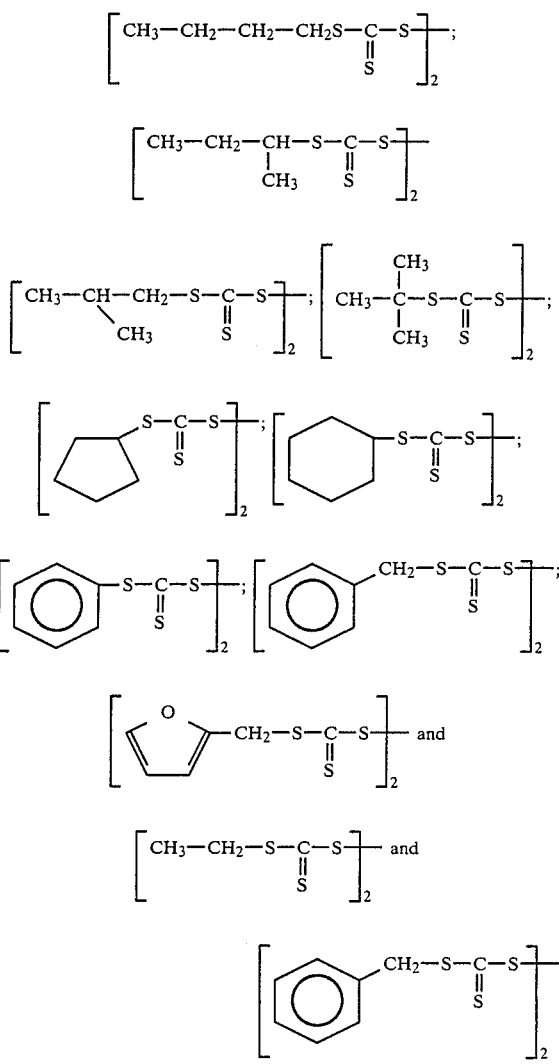

are preferably used, (e) thiuramdisulphides corresponding to formula (IX)

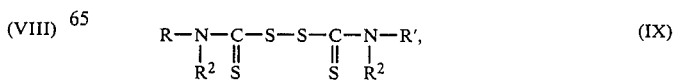 (IX)

wherein R, R' and R² are defined as in formula (IV), for example:
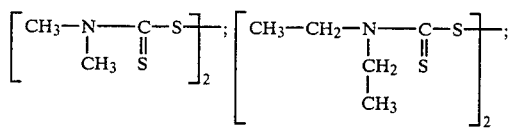
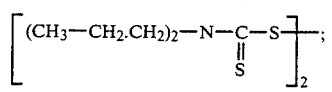
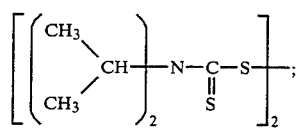
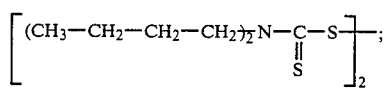
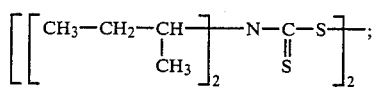
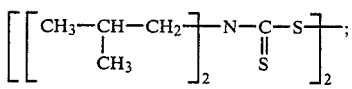
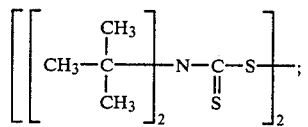
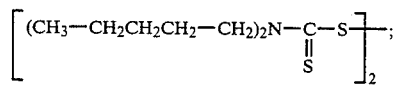
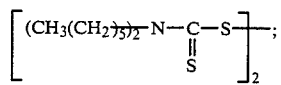
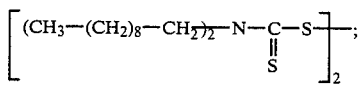
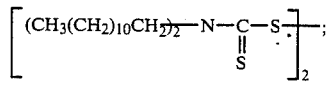
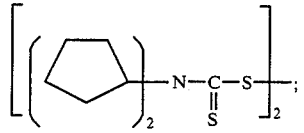
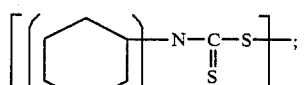
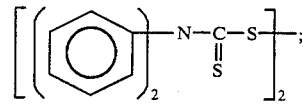
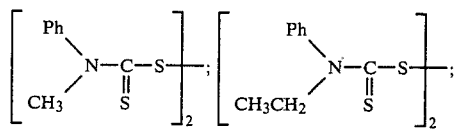
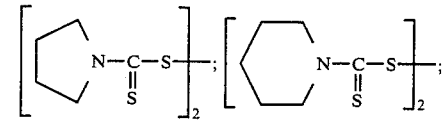
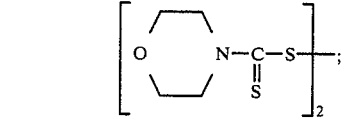
The following thiuramdisulphides are preferably used:
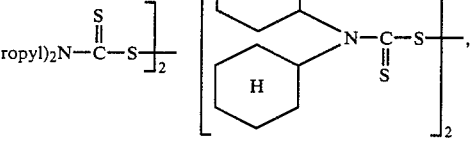
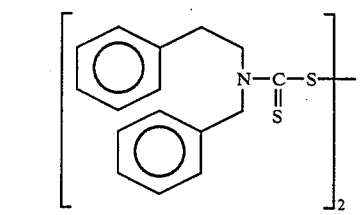
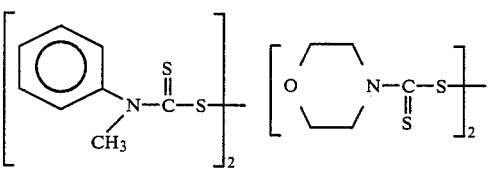
(f) Disulphides (when n=0 in formula IV) corresponding to formula (X)

    (X), wherein R is defined as in formula (IV), for example: dimethyl disulphide, diethyl disulphide, di-n-propyl disulphide, di-n-hexyldisulphide, dicyclohexyl disulphide, diphenyl disulphide, ditolyl disulphide, 4,4'-dichlorodiphenyl disulphide, dibenzyl disulphide, dioctyl disulphide, di-n-/tert.-butyldisulphide, didodecyl disulphide, diamyl- or di-isoamyl disulphide.

Dimethyl disulphide, diethyl disulphide, dibenzyl disulphide or diphenyl disulphide are preferred.

In the present process, the compounds corresponding to formula IV may be used on their own or as mixtures of several of these compounds. Xanthogene disulphides, thiuram disulphides and dialkyl- or diaryl disulphides are preferably used.

From 0.001 to 0.5 mols, preferably from 0.005 to 0.15 mols of disulphides corresponding to formula IV are generally used per mol of alkali sulphide.

The reaction temperature is from 160° to 295° C., preferably from 190° to 275° C.

The length of the reaction (polycondensation) may vary to a considerable extent. It may last for up to 30 hours. It preferably lasts from 0.2 to 15 hours.

The process according to the present invention may be carried out as follows:

The dihalo-benzene or mixtures of dihalo-benzenes, optionally in admixture with a polyhalogen aromatic compound, alkali sulphide and the disulphides may be mixed and reacted in any form in the polar solvent to be used according to this invention. It may be advantageous if water which may be contained in the mixture in the form of water of hydration of the alkali sulphides and/or in a free form as a mixture component of aqueous solutions of the sulphides to be used according to this invention is substantially removed before the dihalo-benzene and the disulphides are added.

Thus, it is advantageous when alkali sulphides containing water of hydration are used for $<1.0$ mol of water, preferably $<0.5$ mols of water per mol of alkali sulphide to be contained in the reaction mixture. One possibility of obtaining this content of water is, for example to pre-dry the starting compounds. This may be achieved, for example by dehydrating the alkali sulphides in the reaction mixture by azeotropic distillation (for example using toluene or xylene) before the reaction. Dehydrated alkali sulphides are preferably used, as a result of which the process is substantially simplified.

If the reaction temperature of the polycondensation reaction according to the present invention is higher than the boiling point of the solvent, the components may be reacted under pressure. A gradual increase of the reaction temperature during the reaction may be advantageous.

Dihalo-benzene and alkali sulphide are generally reacted in equimolar quantities. The molar ratio of dihalo-benzene:alkali sulphide ranges from 0.85:1 to 1.15:1, preferably from 0.95:1 to 1.05:1.

The polyhalogen aromatic compounds corresponding to formula III to be used according to the present invention may be added in a quantity of up to several mol %, based on the quantity of dihalo-benzene. A quantity of up to 5.0 mol %, preferably from 0.1 to 2.0 mol %, based on the quantity of dihalo-benzene is usually sufficient. When polyhalogen aromatic compounds are used, branched polyarylene sulphides are obtained.

The quantity of solvent may be selected within a wide range, and is generally from 2 to 15 mols per mol of alkali sulphide.

In conventional processes, a relatively large quantity of alkali hydroxide has to be mixed with the sodium sulphide to neutralize quantities of alkali hydrogen sulphide which may still be present. This addition does not have to be made in the present process.

The reaction mixture may be worked up in many different ways.

The polyarylene sulphide may be separated from the reaction solution directly or only after the addition of, for example water and/or dilute acids, according to conventional methods, for example by filtration or centrifugation. A wash with water generally follows filtration. A wash or extraction with other washing liquids which may also be carried out as an additional measure or after the water wash is also possible.

The polymer may also be obtained by extracting the solvent from the reaction chamber and by a subsequent wash, as described above.

If the present process is carried out under normal pressure, the polyarylene sulphides are obtained in yields of about 90%. In the known processes, these yields may only be obtained if pressure reactions are carried out which are expensive commercially.

If polyarylene sulphides are produced according to the present process, then substantially smaller quantities of catalyst are required compared to the known processes. Whereas in the known processes, carboxylates are used in approximately equimolar quantities (based on alkali sulphide), just a few mol % suffice in the present process.

Furthermore, another advantage of the present process over conventional processes is the fact that the volume yield of the reaction is better than that of the known processes. Thus, the process is usually carried out in about 20% solution in N-methylpyrrolidone, based on sodium sulphide. However, the present process may be carried out in about 30% solution.

The polyarylene sulphides which are produced according to the present process have a high degree of purity. This is manifested in very high melting points (up to 320° C.). Polyarylene sulphides of this type are distinguished by an increased dimensional stability under heat and thus are particularly advantageous for many technical areas of use, in particular in the electrical and electronics fields and for use in the engine compartment of motor vehicles.

EXAMPLES

Comparative Experiment 1

13.7 g (187 mmol) of lithium acetate×0.4 mols of H$_2$O and 49.1 g (373 mmol) of sodium sulphide (Na$_2$S×3H$_2$O) are introduced into 150 ml of N-methylpyrrolidone and mixed with 0.06 mols of NaOH in 19 ml of H$_2$O. The mixture is stirred for 30 minutes at room temperature under N$_2$, heated and distilled as the temperature rises until the boiling point of N-methylpyrrolidone has been reached (203° C.). It is then cooled to 130° C., and 56.8 g (398 mmol) of p-dichlorobenzene are then added, and the mixture is heated for 12 hours at reflux.

The reaction mixture is absorbed with water and then poured into dilute hydrochloric acid. The deposit is suction filtered, suspended in dichloromethane, suction filtered and dried at 90° C. under a water jet vacuum. 28 g of polyphenylene sulphide (yield of 69%, based on sodium sulphide) are obtained as the product.

Comparative Experiment 2

When the reaction is carried out analogously to Comparative Experiment 1, but without lithium acetate, a yield of 41.9% is obtained.

Example 1

29.96 g (373 mmols) of sodium sulphide ($Na_2S \times 0.13\text{-}H_2O$); 56.85 (387 mmols) of p-dichlorobenzene, 150 ml of N-methylpyrrolidone and 2.25 g (9.3 mmols) of diethyl xanthogene disulphide were weighed into a 500 ml round-bottomed flask equipped with a reflux condenser, a thermometer, a nitrogen inlet pipe and a stirrer. The mixture was then flushed with nitrogen and heated to reflux (reflux temperature from 192° to 194° C.) and then stirred for 12 hours at reflux.

To work up the mixture, 100 ml of N-methylpyrrolidone were distilled off under a partial vacuum (under a pressure of <100 mbar). The remaining mixture was absorbed with $H_2O$/ethanol (1:1) and the deposit was suction filtered. The deposit was then suspended in $HCl/H_2O$ and again suction filtered. The procedure was then repeated in dichloromethane and the deposit was finally washed with ethanol. It is dried for 14 hours at 90° C. under a water jet vacuum, and 35 g of polyphenylene sulphide are obtained (yield of 86.8%, based on sodium sulphide).

Example 2

49.24 g (373 mmol) of sodium sulphide flakes ($Na_2S \times 3H_2O$) were introduced with 50 ml of $H_2O$ into a 500 ml round-bottomed flask equipped with a reflux condenser, a thermometer, a distillation bridge, a nitrogen inlet pipe and a stirrer. The sodium sulphide dissolved upon heating the mixture under $N_2$. The mixture is then dehydrated azeotropically using xylene. During this operation, sodium sulphide precipitates from the solution as a fine powder for the most part. 70 g of water (theoretical value) are obtained as distillate. 150 ml of N-methyl pyrrolidone were then added and the remaining xylene was removed by distilling off the N-methyl pyrrolidone at a temperature of up to 203° C. The mixture is then cooled to from 120° to 150° C. 56.35 g (0.387 mols) of p-dichlorobenzene are added and 4.5 g (18.6 mols) of diethyl xanthogene disulphide in 30 ml of NMP are added dropwise over a period of 15 minutes. The mixture is then heated at reflux for 12 hours and stirred. It is then cooled to about 100° C.

The reaction mixture is absorbed with water and stirred into dilute hydrochloric acid. The deposit is suction filtered, washed with water and then suspended in methylene chloride. The produce is suction filtered, washed with ethanol and then dried for 14 hours in a vacuum drying chamber at 90° C./15 mm Hg.

35 g of polyphenylene sulphide (yield of 86.7%, based on sodium sulphide) are obtained.

Example 3

60.43 g (746 mmol) of sodium sulphide ($Na_2S \times 0.167\text{-}H_2O$), 200 ml of N-methylpyrrolidone, 113.7 g (774 mmol) of p-dichlorobenzene and 4.5 g (18.6 mmol) of diethyl xanthogene disulphide are introduced into a 500 ml round-bottomed flask equipped with a reflux condenser, a thermometer, a nitrogen inlet pipe and a stirrer, and are stirred for 12 hours at reflux in a gentle stream of nitrogen.

After working up the mixture as in Example 2, 69 g of polyphenylene sulphide are obtained (yield of 85.6%, based on sodium sulphide).

Example 4

1333 g (16.41 mols) of sodium sulphide ($Na_2S \times 0.178\text{-}H_2O$), 2503 g (17 mols) of p-dichlorobenzene, 99 g (410 mmol) of diethylxanthogenedisulphide and 4.2 liters of N-methyl pyrrolidone are introduced into a 10 liter cylindrical vessel which is provided with a stirrer, a thermometer, a nitrogen inlet pipe and a reflux condenser. The mixture is flushed with $N_2$ and then stirred at reflux for 12 hours in a gentle stream of nitrogen. After working up as in Example 2, 1445 g of PPS are obtained (yield of 81.5%, based on sodium sulphide).

Example 5

373 mmol of sodium sulphide ($Na_2S \times 0.166H_2O$), 150 ml of N-methyl pyrrolidone, 56,85 g (387 mmol) of p-dichlorobenzene and 2,25 g (9.3 mmol) of diethyl xanthogene disulphide are introduced into a 500 ml round-bottomed flask equipped with a stirrer, a thermometer, a nitrogen inlet pipe and a reflux condenser. The mixture is flushed with nitrogen and heated for 8 hours to reflux. After working up as in Example 2, 34 g of polyphenylene sulphide are obtained (yield of 84.8%, based on sodium sulphide).

Example 6

The mixture and apparatus are the same as in Example 5, but the mixture is stirred for only 6 hours at reflux. After working up as in Example 2, 31 g of polyphenylene sulphide are obtained (yield of 76.9%, based on sodium sulphide).

Example 7

The mixture and apparatus are the same as in Example 2, but instead of using diethyl xanthogene disulphide, 4,73 g (9.3 mmol) of

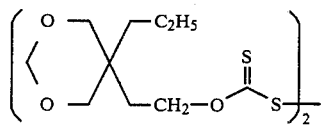

are used.

After working up as described in Example 2, 31 g of polyphenylene sulphide are obtained (yield of 76.9%, based on sodium sulphide).

Example 8

When Example 2 is carried out with 5.05 g (9.3 mmol) of diisopropyl xanthogene disulphide, instead of diethyl xanthogene disulphide, 29 g of polyphenylene sulphide are obtained (yield of 72%).

Example 9

If Example 2 is carried out with 6.84 g (9.3 mmol) of dibenzyl xanthogene disulphide, 29 g of polyphenylene sulphide are obtained (yield of 72%).

Examples 10 to 17

Other experiments were carried out analogously to Example 5, in each case starting with
29.66 g (373 mmol) of $Na_2S \times 0.085H_2O$, and
56.85 g (387 mmol) of p-dichlorobenzene, and 150 ml of N-methyl pyrrolidone, and the catalysts which are mentioned in the Table produced the results which are also stated in said Table.

| Example | Catalyst Type | Quantity g | (mMol) | Yield of PPS g | % | M.p. of the PPS Samples |
|---|---|---|---|---|---|---|
| 10 | [(C₂H₅)₂—N—C(=S)—S—]₂ | 5.5 | 18.6 | 33 | 81.9 | |
| 11 | [(CH₃)₂—N—C(=S)—S—]₂ | 4.48 | 18.63 | 33 | 81.8 | 291–96 |
| 12 | [C₆H₅(H₃C)—N—C(=S)—S—]₂ | 6.8 | 18.63 | 34 | 84.3 | 282–87 |
| 13 | [morpholino—C(=S)—S—]₂ | 6.05 | 18.63 | 31 | 76.9 | 282–86 |
| 14 | piperazine-1,4-bis(dithiocarbamate) cyclic | 4.4 | 18.63 | 31 | 76.9 | 293–304 |
| 15 | CH₃—S—S—CH₃ | 0.88 | 9.32 | 37 | 91.7 | 270–77 |
| 16 | C₆H₅—S—S—C₆H₅ | 2.04 | 9.32 | 36.5 | 90.5 | 270–78 |
| 17 | Cl—C₆H₄—S—S—C₆H₄—Cl | 2.68 | 9.72 | 35.5 | 88 | 275–81 |

We claim:
1. A process for the production of optionally branched, high molecular weight polyarylene sulphides, from
 (a) dihalo-benzenes, of which from 0 to 100 mol % correspond to formula (I)

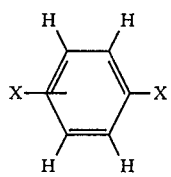
(I)

and from 0 to 100 mol % correspond to formula (II)

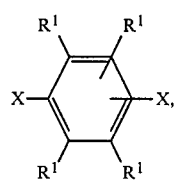
(II)

wherein each
X represents a halogen which is in the meta- or para-position with respect to the other and
R¹ is the same or different, and represent hydrogen, C₁–C₂₀ alkyl, C₅–C₂₀ cycloalkyl, C₆–C₂₄ aryl, C₇–C₂₄ alkaryl or C₇–C₂₄ aralkyl, or two radicals R¹ which are in the ortho-position with respect to one another linked to form an aromatic or heterocyclic 5 to 10-membered ring which contains up to three heteroatoms, and at least one radical $R^1$ is always different from hydrogen, and (b) from 0 to 5.0 mol %, based on the total of the dihalogen aromatic compounds corresponding to formulae (I) and (II), of a tri- or tetrahalogen aromatic compound corresponding to formula (III)

$$ArHal_n \qquad (III),$$

wherein

Ar represents an aromatic or heterocyclic radical which contains up to three heteroatoms, and has from 6 to 24 carbon atoms, Hal represents halogen, and n represents the number 3 or 4, and (c) alkali sulphides, the molar ratio of (a+b):c ranging from 0.85:1 to 1.14, (d) in a polar solvent the molar ratio of (c) to (d) ranging from 1:2 to 1:15, characterized in that the above-mentioned components are reacted together in the presence of disulphides corresponding to formmula (IV)

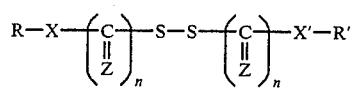 (IV)

wherein

R and R' which are the same or different, represent $C_1$–$C_{20}$ alkyl, $C_5$–$C_{20}$ cycloalkyl, $C_6$–$C_{24}$ aryl or $C_7$–$C_{24}$ aralkyl, and in the case of the cycloalkyl, or aryl or aralkyl radicals with from 1 to 3 ring carbon atoms replaced by heteroatoms, X and X' which may be the same or different, represent a single bond, O, S or

wherein $R^2$ represents hydrogen and has the meaning stated for R,

Z which is the same or different, represents O, S, NR, wherein R is as defined above, and n represents 0 or 1.

2. A process according to claim 1, characterised in that diacyldisulphides are used as compounds corresponding to formula (IV).

3. A process according to claim 1, characterised in that dithioacyl disulphides are used as compounds corresponding to formula (IV).

4. A process according to claim 1, characterised in that xanthogene disulphides are used as compounds corresponding to formula (IV).

5. A process according to claim 1, characterised in that derivatives of trithiocarbonic acid are used as compounds corresponding to formula (IV).

6. A process according to claim 1, characterised in that thiuramdisulphides are used as compounds corresponding to formula (IV).

7. A process according to claim 1, characterised in that alkyl and/or aryl disulphides are used as compounds corresponding to formula (IV).

8. A process according to claim 1, characterised in that the reaction mixture contains less than one mol of water per mol of alkali sulphide.

9. A process according to claim 1 wherein component (c) is alkali sulphide as a hydrate together with an alkali hydroxide.

10. A process according to claim 1 wherein component (d) is a polar solvent in the presence of a co-solvent.

* * * * *